(12) United States Patent
Has

(10) Patent No.: US 8,220,337 B2
(45) Date of Patent: Jul. 17, 2012

(54) MICROMECHANICAL SENSOR ELEMENT FOR CAPACITIVE PRESSURE DETECTION

(75) Inventor: Remigius Has, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/931,501

(22) Filed: Feb. 1, 2011

(65) Prior Publication Data
US 2011/0185816 A1    Aug. 4, 2011

(30) Foreign Application Priority Data
Feb. 3, 2010   (DE) .......................... 10 2010 001 537

(51) Int. Cl.
*G01L 9/12* (2006.01)

(52) U.S. Cl. ................ 73/718; 73/724; 73/716; 73/736; 257/415

(58) Field of Classification Search ............. 73/700–756
See application file for complete search history.

(56) References Cited

U.S. PATENT DOCUMENTS

| | | | | |
|---|---|---|---|---|
| 5,259,247 A * | 11/1993 | Bantien | ............................ | 73/718 |
| 5,677,560 A * | 10/1997 | Zimmer et al. | ................ | 257/418 |
| 5,914,520 A * | 6/1999 | Werner | ........................... | 257/415 |
| 6,046,067 A * | 4/2000 | Werner | ............................ | 438/52 |
| 6,263,741 B1 * | 7/2001 | Woias | ........................ | 73/861.47 |
| 6,369,435 B1 * | 4/2002 | Igel | ................................. | 257/415 |
| 6,518,084 B1 * | 2/2003 | Seitz et al. | ...................... | 438/53 |
| 2011/0163398 A1 * | 7/2011 | Laermer et al. | ................ | 257/416 |
| 2011/0192236 A1 * | 8/2011 | Doering et al. | ............ | 73/862.68 |

* cited by examiner

*Primary Examiner* — Andre Allen
(74) *Attorney, Agent, or Firm* — Kenyon & Kenyon LLP

(57) ABSTRACT

A micromechanical capacitive pressure sensor has a layered structure, which includes at least one deflectable carrier element for at least one deflectable measuring electrode in a first layer plane and at least one stationary carrier structure for at least one counter electrode in a second layer plane parallel to the first layer plane. The carrier structure is suspended in a closed cavity of the layered structure between two diaphragms, which are oriented essentially perpendicularly to the layer planes and delimit the cavity on two opposite sides. At least one pressure connection aperture is provided, via which at least one of the two diaphragms may be subjected to a pressure being measured. The carrier element is connected to the two diaphragms in such a way that diaphragm deformations cause a parallel shift of the measuring electrode relative to the counter electrode.

8 Claims, 4 Drawing Sheets

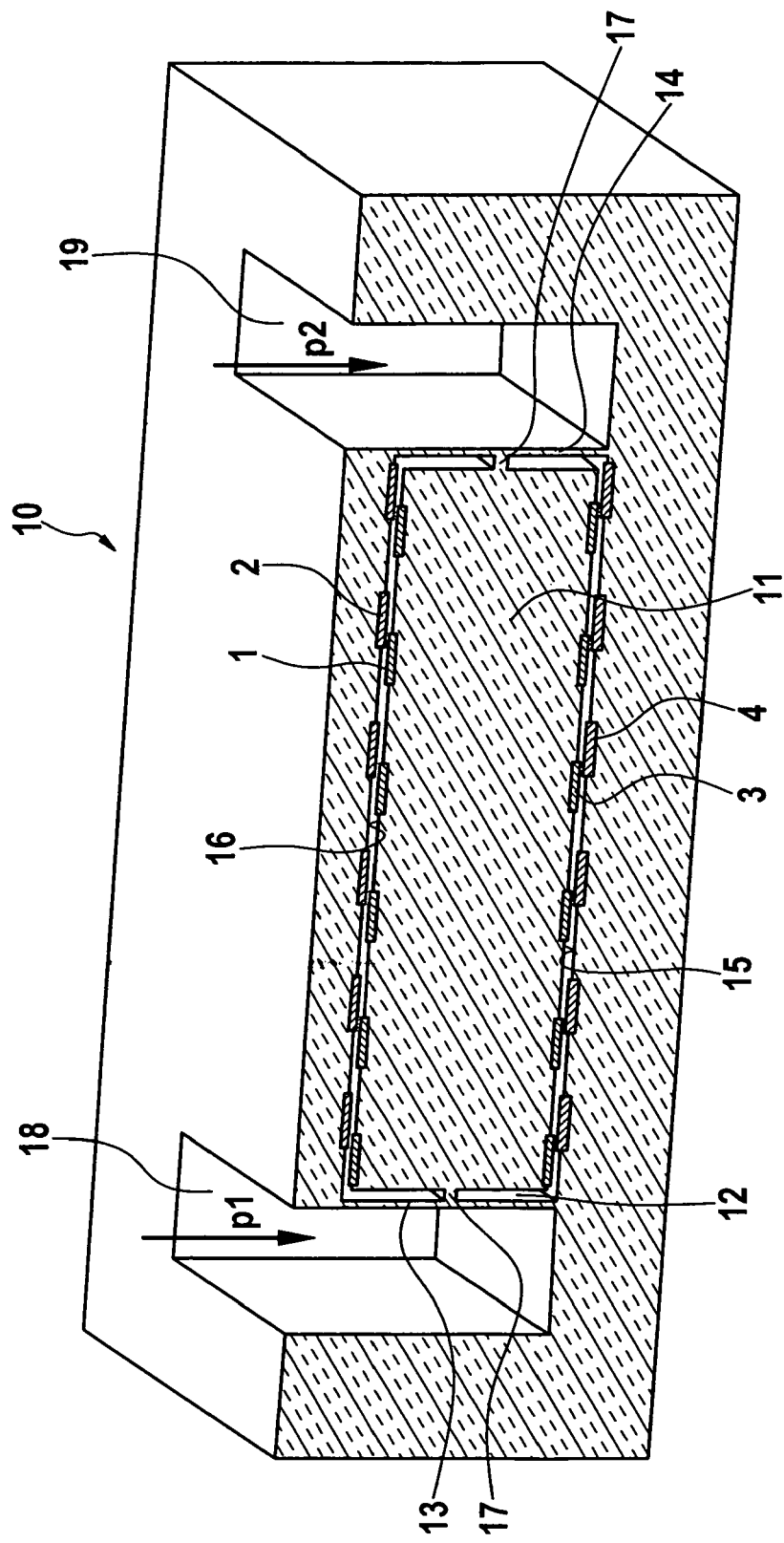

MICROMECHANICAL SENSOR ELEMENT FOR CAPACITIVE PRESSURE DETECTION

BACKGROUND OF THE INVENTION

1. Field of the Invention

The present invention relates to a micromechanical sensor element for capacitive pressure detection, whose structure elements are implemented in a layered structure. The sensor element includes at least one displaceable carrier element for at least one displaceable sensing electrode in a first layer plane and at least one fixed carrier structure for at least one fixed counter electrode in a second layer plane, the first and second layer planes being situated parallel to each other.

2. Description of the Related Art

Pressure sensors having micromechanical sensor elements are used today in machine construction, process engineering, automotive engineering and medical technology for diverse measuring tasks. Differential pressure sensors are used to compare pressures that prevail in two chambers or media that are separated from each other. The media being measured may be liquids, gases or vapors.

A typical use of micromechanical differential pressure sensors in automotive engineering is comparing the exhaust gas pressure before and after the particulate filter. Since very high absolute pressures occur here and the exhaust gases form an aggressive particulate-bearing measuring environment, there are increased demands on the dynamics and ruggedness of the sensor element in regard to its micromechanical structure, but also in regard to signal detection.

One possibility for differential pressure determination is detecting the two measured pressures to be compared with the aid of two independent absolute pressure sensors and then calculating the difference between the measured values thus obtained. In practice, however, this method usually does not yield satisfactory results. The reason for this is found in the insufficient measuring accuracy of the generally available absolute pressure measuring devices, which is not adequate to determine the pressure difference with sufficient accuracy, in particular in the case of wide pressure ranges and/or high absolute pressures but small differential pressures.

BRIEF SUMMARY OF THE INVENTION

With the present invention, a sensor concept for capacitive pressure measurement is proposed, which yields very reliable measurement results and is also suitable for use in aggressive particle-bearing measuring environments.

According to the present invention, the carrier element for the displaceable measuring electrode is suspended in a closed cavity of the layered structure, between two diaphragms which are oriented essentially perpendicularly to the layer planes of the sensor element, and which delimit the cavity on two opposite sides. At least one pressure connection aperture is provided, via which at least one of the two diaphragms may be subjected to a pressure being measured. The carrier element is connected to the two diaphragms in such a way that diaphragm deformations cause an essentially parallel displacement of the measuring electrode relative to the counter electrode, wherein the degree of overlap between measuring electrode and counter electrode changes.

It is essential for the sensor concept according to the present invention that the measuring capacitor is located within a cavity in the sensor structure which is closed off from the medium being measured. In this way, the capacitor electrodes and the capacitor structure are optimally protected from attack by aggressive media being measured and from soiling by particles in the medium being measured. It is also essential that the displacement of the measuring electrode occurs parallel to the counter electrode, so that the degree of overlap of the capacitor electrodes changes, but not the distance between them. Because of the direction of displacement of the measuring electrode, a comparatively small distance between the electrodes of the measuring capacitor may be chosen, which is not only advantageous in regard to miniaturizing the sensor element, but also contributes to a relatively high measuring sensitivity. When the capacitor electrodes are laid out properly, the relationship between the change in capacitance of the measuring capacitor and the displacement of the measuring electrode is linear.

Accordingly, the measuring sensitivity of the sensor element according to the present invention is essentially constant over its entire measuring range. In addition, evaluation of the measurement signal is particularly simple in the case of a linear relationship between measured value and measurement signal.

According to the present invention, the pressure being measured is not applied directly to the carrier element having the measuring electrode, but indirectly via two diaphragms. These diaphragms function as the suspension system for the carrier element, and with their orientation perpendicular to the layer planes they determine the direction of motion of the measuring electrode parallel to the counter electrode.

If the sensor element according to the present invention is to be used for absolute pressure measurement, then only one pressure connection is provided, via which the pressure being measured is applied to one of the two diaphragms. In this case, the other diaphragm closes off the cavity on one side and a reference volume on the other side. Since the carrier element forms a rigid connection between the two diaphragms, the pressure being measured acts equally on both diaphragms. Accordingly, the direction of displacement of the carrier element including the measuring electrode depends on whether the pressure being measured is higher or lower than the pressure in the reference volume.

The sensor concept according to the present invention is particularly advantageous for implementing sensor elements for detecting differential pressures. In these sensor elements a separate pressure connection is provided for each of the two diaphragms, so that a first measured pressure p1 is routed to the one diaphragm, while a second measured pressure p2 is applied to the other diaphragm. Thus the direction of deflection of the carrier element having the measuring electrode depends on which of the two measured pressures p1 and p2 being compared is greater. Accordingly, the sensor structure in this case does not have to be designed for the particular pressure range of the individual measured pressures p1 and p2, but may be configured to match the range of fluctuation of the pressure difference |p1−p2| between the measured pressures p1 and p2 being compared. That enables even small pressure differences at high absolute pressures to be detected reliably.

As mentioned earlier, according to the present invention the electrodes of the measuring capacitor must be designed in such a way that their degree of overlap changes in the event of a displacement of the measuring electrode. In principle, this condition may be met by a great variety of electrode layouts.

In the case of detecting differential pressures, it is particularly advantageous if in addition the geometry and arrangement of measuring electrode and counter electrode are matched to each other in such a way that the direction of the detected pressure gradient is also determinable on the basis of the change in capacitance.

In this connection, measuring electrodes and counter electrodes of comb-shaped or ladder-shaped design prove to be particularly well suited. The measurement signals thus obtained have a relatively large amplitude range, which contributes to increased measuring accuracy of the sensor element.

In a particularly robust variant of the sensor element according to the present invention, at least one measuring electrode is situated on each of the two main surfaces of the carrier element. The corresponding counter electrodes are located in this case on the respective opposite wall of the cavity. With an electrode arrangement of this sort it is simple to implement two mutually independent measuring capacitors, for example in order to increase the failure safety of the sensor element. The upper and lower electrodes may also be brought together, however, in order to increase the capacitance signal at the same diaphragm displacement. The distance from the upper electrode to the middle electrode and from the lower electrode to the middle electrode is also a decisive determinant of the output signal and of the change in capacitance.

It is essential for the functioning of the sensor element according to the present invention that the pressure-induced diaphragm deformations are transmitted unchanged to the carrier element and cause a displacement of the carrier element parallel to the layer planes. For that reason, the carrier element is rigidly connected to the diaphragms. In order to achieve the highest diaphragm sensitivity possible, in a particularly advantageous variant of the present invention the carrier element is connected to each of the diaphragms only through a thin but inflexible bridge, which is preferably situated in the middle area of the diaphragm, the area of greatest deformation, and is oriented parallel to the layer planes.

The vibration sensitivity of the sensor element according to the present invention may be reduced advantageously by lessening the mass of the carrier element. To that end the carrier element is simply structured outside of the range of the measuring electrode, i.e., for example provided with perforations.

Since the sensor concept according to the present invention is based on capacitive pressure detection, it is advantageous to use wireless measurement signal detection. To that end, the electrode elements of the measuring capacitor are connected to a coil to make an oscillating circuit. Capacitance changes of the measuring capacitor shift the resonant frequency of this oscillating circuit, which may be detected inductively with the aid of an additional coil. A sensor system of this type turns out to be particularly robust in its construction and in regard to resistance to media, since no connecting lines between the electrode elements of the measuring capacitor and the analysis circuit are needed.

BRIEF DESCRIPTION OF THE DRAWINGS

FIG. 1 shows a perspective cross-sectional view of a first sensor element 10 according to the present invention for differential pressure detection, having pressure connection apertures situated on one side.

DETAILED DESCRIPTION OF THE INVENTION

Figure 2A:
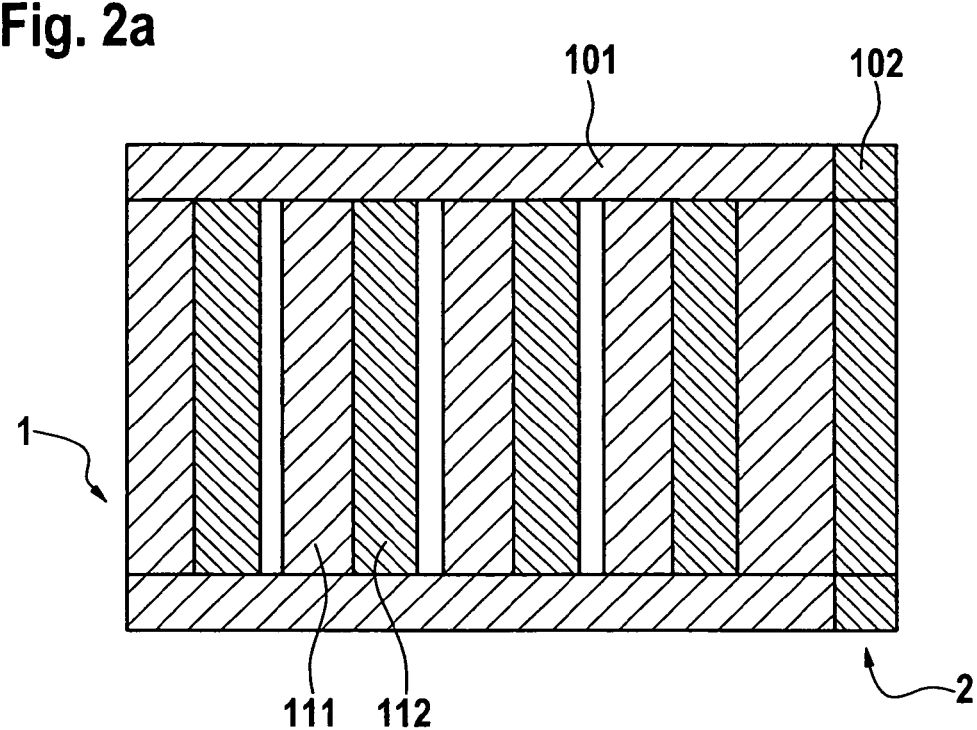
FIGS. 2a and 2b show the degree of overlap of the measuring electrode and the corresponding counter electrode of a sensor element having the measuring electrode in a non-displaced and a displaced state.

The sensor structure of micromechanical sensor element 10 for differential pressure detection depicted in FIG. 1 is implemented in a layered structure, the layers of which are not designated individually here for the sake of overall clarity. The sensor structure includes a displaceable carrier element 11, which is suspended in a closed cavity 12 in the layered structure, in fact between two diaphragms 13 and 14. These two diaphragms 13 and 14 are oriented perpendicularly to the layer planes of the layered structure, and in the exemplary embodiment depicted here form two opposing side walls of essentially cuboid cavity 12. The other two side walls of cavity 12, which are not visible in the present cross-sectional view, are of rigid design, as are floor 15 and ceiling 16 of cavity 12. Carrier element 11 is connected here to each of diaphragms 13 and 14 via a thin but inflexible bridge 17, which is situated in the middle area of diaphragm 13 or 14 and is oriented parallel to the layer planes. This ensures that diaphragm deformations cause exclusively a displacement of carrier element 11 parallel to the layer planes.

Since sensor element 10 is intended for differential pressure detection, both diaphragms 13 and 14 are each subjected to one of the pressures being measured, p1 and p2. The pressure is applied via the two pressure connection apertures 18 and 19, both of which are formed in the surface of the component in the exemplary embodiment depicted here. Since it is possible to produce the pressure connections in this case by appropriate processing of the surface of the component, i.e., without processing the back, it is also possible to integrate parts of the analysis circuit in the sensor structure in the manufacturing process. This makes it possible to implement a monolithic sensor chip having the sensor structure according to the present invention.

The signal is detected capacitively. To that end, there is a measuring electrode 1 or 3 located on each of the two main surfaces of displaceable carrier element 11. Corresponding counter electrodes 2 and 4 are situated opposite these on roof 16 and floor 15 of cavity 12. The cavity walls function here as a stationary carrier structure for counter electrodes 2 and 4. The process technique for producing the capacitor electrodes may use local dopings, for example, which are separated by oxide sections, or else structured surface profiles. To prevent short circuiting in the event of contact between the relatively closely spaced capacitor electrodes, at least one of the two electrode surfaces may be provided with an insulating layer. As mentioned earlier, a pressure-induced deflection of carrier element 11 always runs parallel to the layer planes of the layer structure. As this occurs, measuring electrodes 1 and 3 are moved parallel to corresponding counter electrodes 2 and 4, causing the degree of overlap between measuring electrode 1 or 3 and counter electrode 2 or 4 to change according to the present invention.

Figure 2B:
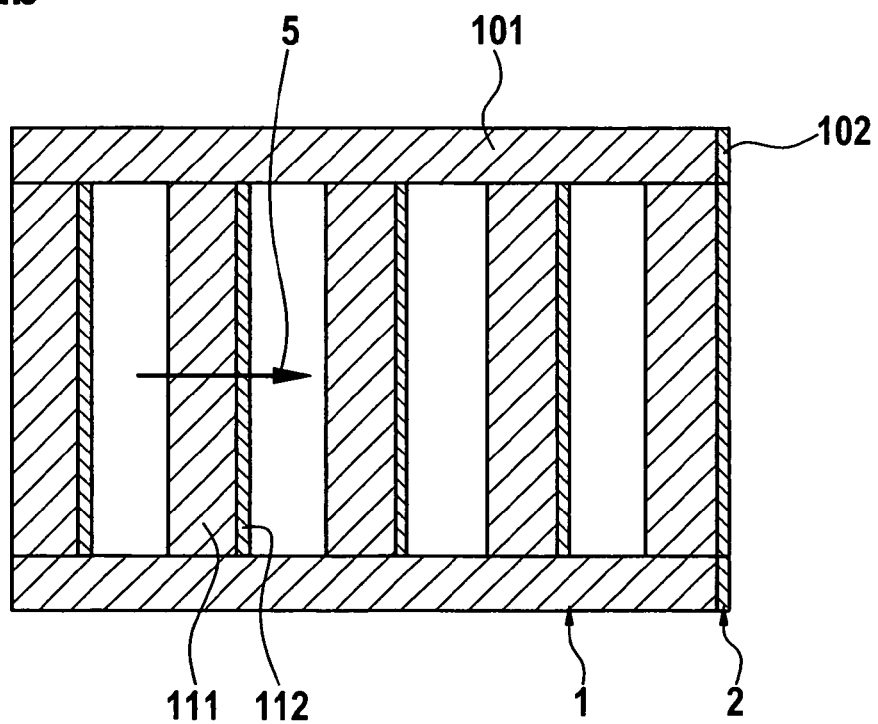

This is illustrated particularly well by FIGS. 2a and 2b, which show the layout and arrangement of a measuring electrode 1 in reference to corresponding counter electrode 2, on the one hand for the case p1=p2 (FIG. 2a) and on the other hand for the case p1>p2 (FIG. 2b). Both measuring electrode 1 and counter electrode 2 are of ladder-shaped design here. The two electrodes 1 and 2 are situated one above the other in such a way that ladder side-rails 101 and 102 overlap, and rungs 111 and 112 are oriented parallel to each other. Since side-rails 101 and 102 are oriented parallel to the direction of deflection of the carrier element, rungs 111 and 112 are pushed to greater overlap or further apart when the carrier element is deflected, depending on the direction of deflection. In FIG. 2b, the direction of deflection for the case p1>p2 is indicated by an arrow 5.

Figure 3A:
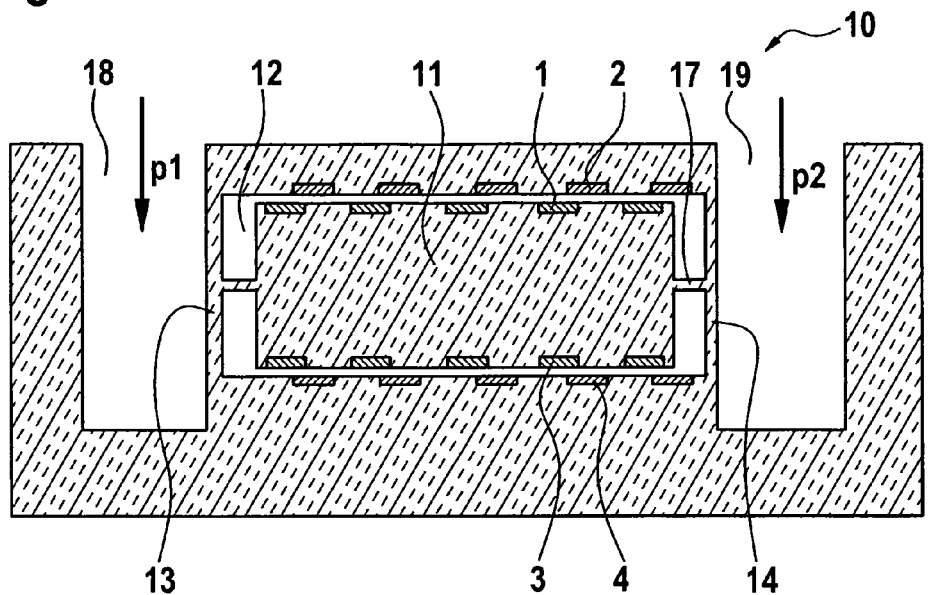
FIGS. 3a and 3b show schematic cross-sectional views of sensor element 10 in the states of displacement depicted in FIGS. 2a and 2b.
Figure 3B:
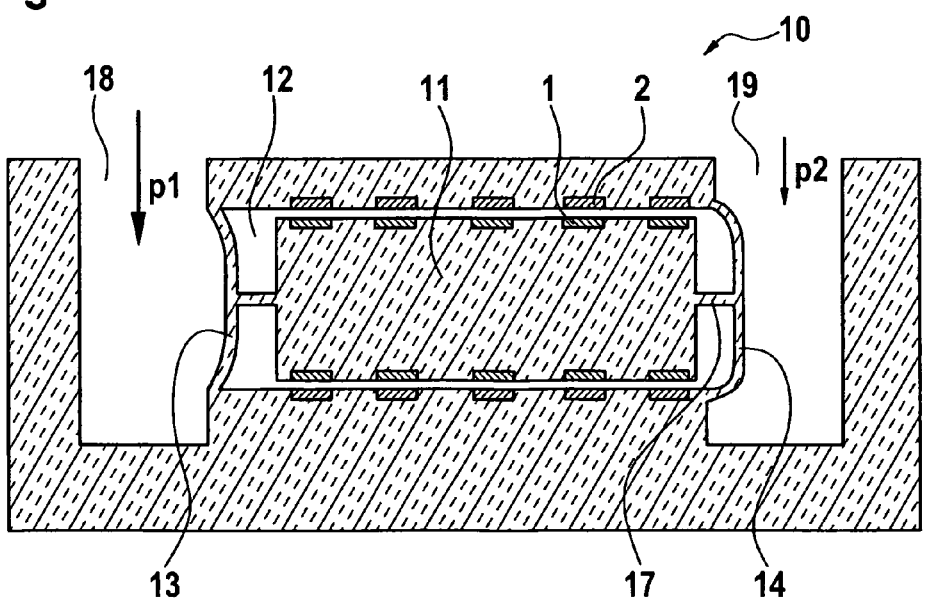

The diaphragm positions corresponding to FIGS. 2a and 2b are depicted in FIGS. 3a and 3b. These figures are schematic cross-sectional views of sensor element 10, for which reason we refer here to the description and reference numerals of FIG. 1.

If pressures p1 and p2 equal zero or are identical, then either no pressure forces are acting or the two forces acting on diaphragms 13 and 14 cancel out each other. This case is depicted in FIG. 3a. There is a distance defined by the sensor design, as well as a defined degree of overlap between measuring electrodes and corresponding counter electrodes 1 and 2 or 3 and 4 respectively, which determine the value of output capacitance CO of the measuring capacitors together with the layout of the electrodes.

If the two pressures p1 and p2 differ, both diaphragms 13 and 14 are deformed equally, since the pressure force corresponding to the pressure difference is transmitted via rigid carrier element 11 and bridges 17 from one diaphragm to the other. At the same time, carrier element 11 having measuring electrodes 1 and 3 is moved plane-parallel, i.e., parallel to the layer planes, from the rest position depicted in FIG. 3a. That changes the degree of overlap of measuring electrodes 1, 3 and corresponding counter electrodes 2, 4, and consequently also the capacitance of the measuring capacitors.

If p1 is greater than p2, as depicted in FIG. 3b, then the shift of carrier element 11 results in a higher degree of overlap of the measuring capacitor electrodes. There is a linear relationship between the resulting increase in the measuring capacitance and pressure difference |p1−p2|.

In the exemplary embodiment depicted here, the sensor is designed in such a way that the degree of overlap of the measuring capacitor electrodes decreases in the opposite case, i.e., when p2 is greater than p1. This results in a reduction in the measuring capacitance. Besides the magnitude of the pressure difference, sensor element 10 may also be used to easily determine the direction thereof, i.e., which of the two pressures being measured, p1 and p2, is greater.

Figure 4:
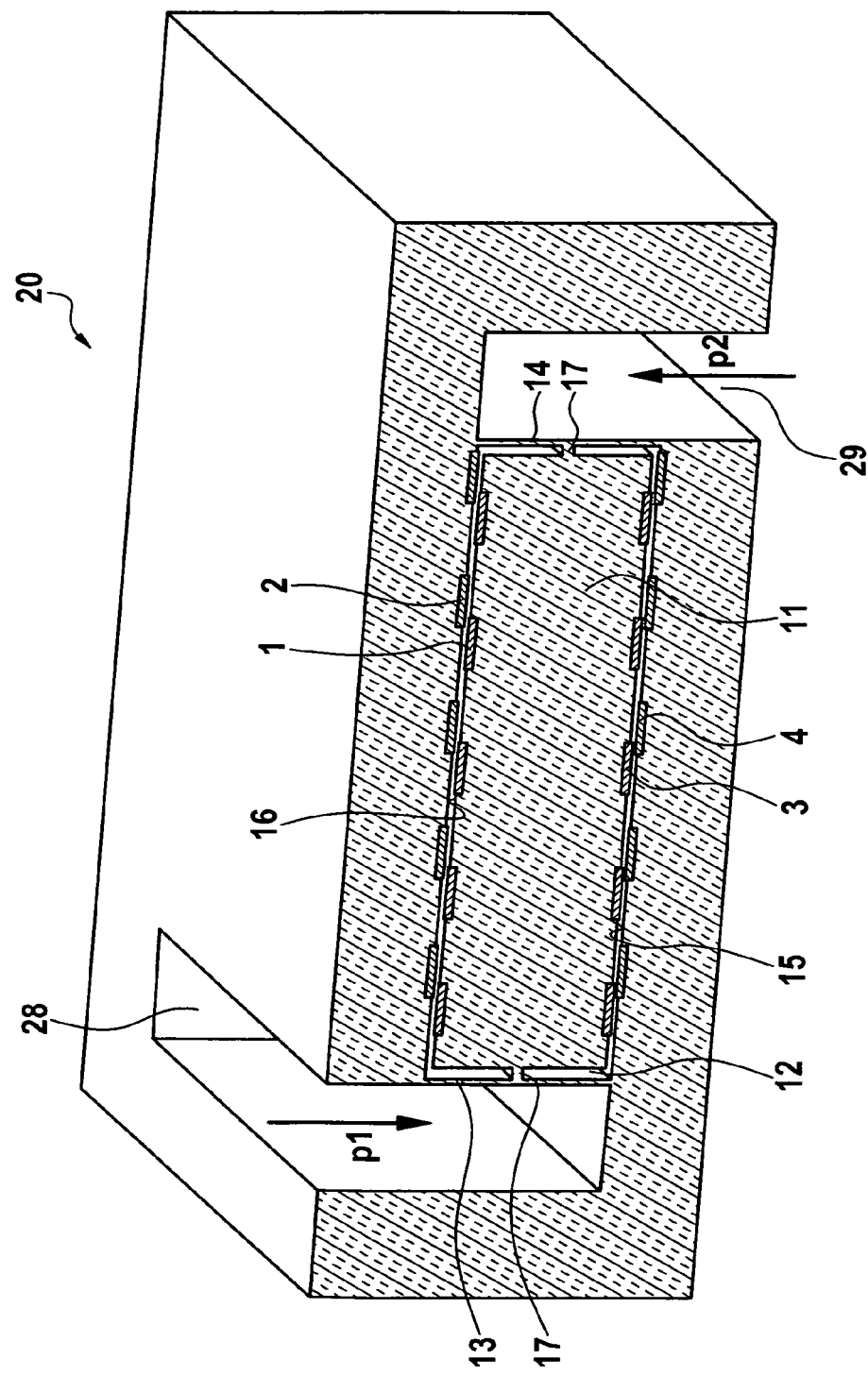
FIG. 4 shows a perspective cross-sectional view of a second sensor element 20 according to the present invention for differential pressure detection, having pressure connection apertures situated on two sides.

FIG. 4 shows a sensor element 20 for differential pressure detection, whose sensor structure corresponds to the sensor structure of sensor element 10 depicted in FIGS. 1 through 3, except for the arrangement of the pressure connection apertures. Equivalent structural and functional elements are therefore designated by the same reference numerals. In contrast to pressure connection apertures 18 and 19 of sensor element 10, both of which are formed in the surface of the component, one pressure sensor aperture 28 of sensor element 20 is located in the surface of the component, while the other pressure connection aperture 29 is formed in the back of the component.

The arrangement of the pressure connection apertures depends essentially on the use, and on the space conditions at the location where the sensor element according to the present invention is employed. Thus under certain boundary conditions two-sided pressure connection proves to be advantageous, while in other cases one-sided pressure connection is preferable. Forms of implementation having a lateral pressure connection are also conceivable.

What is claimed is:

1. A micromechanical capacitive pressure sensor having a layered structure, comprising:
   at least one deflectable carrier element for at least one deflectable measuring electrode in a first layer plane; and
   at least one stationary carrier structure for at least one stationary counter electrode in a second layer plane;
   wherein:
   the first and second layer planes are situated parallel to each other;
   the deflectable carrier element is suspended in a closed cavity of the layered structure between two diaphragms oriented essentially perpendicularly to the first and second layer planes, the two diaphragms delimiting the closed cavity on two opposite sides;
   at least one pressure connection aperture is provided, and at least one of the two diaphragms is subjected to a pressure being measured via the at least one pressure connection aperture; and
   the deflectable carrier element is connected to the two diaphragms in such a way that diaphragm deformations cause an essentially parallel shift of the measuring electrode relative to the counter electrode, the degree of overlap between the measuring electrode and the counter electrode changing during the parallel shift of the measuring electrode relative to the counter electrode.

2. The sensor as recited in claim 1, wherein a separate pressure connection aperture is provided for each of the two diaphragms.

3. The sensor as recited in claim 2, wherein the at least one measuring electrode and the counter electrode are configured and oriented in such a way that the direction of detected pressure gradient is determinable on the basis of the change in capacitance.

4. The sensor as recited in claim 3, wherein at least one of the measuring electrodes and the counter electrode has one of a comb-shaped configuration or ladder-shaped configuration.

5. The sensor as recited in claim 3, wherein at least one measuring electrode is situated on each of two main surfaces of the deflectable carrier element, and corresponding counter electrodes are situated on walls of the closed cavity opposing the two main surfaces of the deflectable carrier element.

6. The sensor as recited in claim 3, wherein the deflectable carrier element is connected to the two diaphragms via two corresponding inflexible bridges, and wherein the bridges are each situated in the middle area of the corresponding diaphragms and are oriented parallel to the layer planes.

7. The sensor as recited in claim 3, wherein the deflectable carrier element is structured outside of the area of the measuring electrode.

8. The sensor as recited in claim 3, wherein the at least one measuring electrode and the counter electrode are connected to a coil to form an oscillating circuit, and an additional coil is provided to detect the resonant frequency inductively.

\* \* \* \* \*